United States Patent [19]

Herring

[11] 4,219,585

[45] Aug. 26, 1980

[54] PROCESS FOR EXTRACTING OIL FROM EGG YOLKS

[76] Inventor: Nancy I. Herring, 3699 Southmont Dr., Montgomery, Ala. 36105

[21] Appl. No.: 948,001

[22] Filed: Oct. 2, 1978

[51] Int. Cl.[2] .......... A23L 1/32

[52] U.S. Cl. .......... 426/614; 426/417; 426/520; 424/105

[58] Field of Search .......... 426/614, 417, 520; 424/105

[56] References Cited

U.S. PATENT DOCUMENTS

| | | | |
|---|---|---|---|
| 3,483,009 | 12/1969 | Herr | 426/614 X |
| 3,563,765 | 2/1971 | Melnick | 426/614 |
| 3,607,304 | 9/1971 | Levin | 426/614 |
| 3,717,474 | 2/1973 | Fioriti et al. | 426/614 |
| 3,958,034 | 5/1976 | Hath et al. | 426/614 |
| 4,119,713 | 10/1978 | Carosio | 424/105 X |

*Primary Examiner*—Robert A. Yoncoskie
*Attorney, Agent, or Firm*—Harold C. Hogencamp

[57] ABSTRACT

An efficient simplified process for extracting the maximum amount of oil from egg yolks by use only of heat. The primary product thus obtained is unadulterated, sterilized and medically pure egg oil.

3 Claims, No Drawings

PROCESS FOR EXTRACTING OIL FROM EGG YOLKS

This invention relates to a simplified heat process for efficiently extracting the maximum amount of oil from egg yoks. More particularly, the process produces unadulterated egg oil which is sterile and medically pure as the principal product.

Based upon the teachings of prior-art patents and the medical profession it appears that egg oil and/or egg fat, contained as a natural ingrdient of egg yolks, has been looked upon only as a source of cholesterol—a potential cause of certain human ills—the removal of which is highly desirable.

In two such issued patents processes have been disclosed for the removal of the oil and/or fat and the cholesterol contained therein from the egg yolks.

U.S. Pat. No. 3,563,765 titled LOW CHOLESTEROL DRIED EGG YOLK AND PROCESS "comprises solvent-extracting from egg yolk solids at least a substantial portion of the free fat content of the solids . . . A solution of extracted fat is obtained. . . . The extraction process preferably is carried out by mixing substantially dry egg yolk solids with a fat solvent . . . The mixture is heated with constant agitation to a temperature not in excess of 160° F., preferably not in excess of 120° F. . . . The egg fat is recovered from solvent by distilling off the latter for reuse in the system. . . . The extracted egg oil is a by-product for use in feeds or the like. . . . (and) . . . The invention also provides as a by-product, egg oil that is suitable for many applications in feeds and industrial uses."

Obviously, the egg oil being only a by-product in this process, nothing is done to assure that it is not contaminated with residue from the solvent. Further, since only heat "not in excess of 160° F." is employed the oil would not be sterilized.

U.S. Pat. No. 3,717,474 is titled LOW CHOLESTEROL EGG PROCESS and likewise is directed to removal of the cholesterol from egg yolks. Wet egg yolks are processed rather than dried egg yolks in this case. A polyunsaturated oil, such as safflower oil or the like, is employed in conjunction with a high-energy, high-sheer mixer, such as a Waring Blendor, to extract the cholesterol from the yolk into the processing oil. Here warning is given to "keep the rising temperature of the mixer from cooking the egg yolk." and "When the temperature rises much above 149° F. although all the cholesterol can be extracted, cooking of the yolk commences . . . " In this patent there is no mention of recovering the extracted egg oil and/or egg fat from the processing oil nor is any potential further use given for the resultant mixture or solution.

By contrast, the present invention relates to a process for extracting the egg oil for its own value and usefulness. The other components are not presently sought after.

With the foregoing in mind, the principal object of this invention is to provide a process for the extraction of oil from egg yolks as the prime product.

A second object is to provide a simplified process using only heat and stirring to extract a maximum amount of such oil from egg yolks, without regard to the effects of such heat on the other natural components of the eggs.

A further object is to obtain an unadulterated, sterile and medically pure egg oil product by this process.

Still other objects will become apparent from this disclosure and the appended claims.

The inventor of the herein disclosed process for extraction of egg oil has also discovered an extremely valuable use for this natural ingredient of egg yolks in addition to its use in feeds or the like. Egg oil extracted by this process has proven to be of exceptional value as a treatment for external human and/or animal burns. If applied on the area quickly after the burn occurs, and with often-repeated application thereafter (preferably at least three or four times a day) in order to keep the burn area moist with the oil, it not only alleviates the pain but also often prevents a scar.

However, and most importantly, because of the extreme susceptibility of external burns to infection, the applied egg oil must be absolutely and completely sterile and medically pure. The egg oil derived from the process entailed in the present invention meets these strict medical requirements. Other perhaps equally important uses may also be found when this egg oil product is made widely available.

The simplified egg oil extraction process employed in the present invention is this:

An egg, or quite obviously a number of eggs, are placed in boiling water. After the water has again regained the boiling temperature of 212° F. the eggs are boiled for an optimum time period of about twenty (20) minutes. (note that fifteen (15) minutes might be sufficient and even twenty five (25) or thirty (30) minutes may not be harmful, except for reason of total heat-energy economy and efficiency.)

The very-hard-boiled eggs are then taken out of the water and the shells are broken, removed and discarded.

The yolks are separated from the white albumen portions of the hard-boiled eggs; the yolks being retained and the whites discarded or set aside as a by-product for other uses.

The yolks are then placed in a clean, cool, dry cooking vessel, which preferably has previously been sterilized, and the cooking vessel is placed over heat. In about fifteen (15) minutes—depending on the temperature of the heat source—the heating vessel should reach a temperature of 375° to 400° F. and signs of egg oil will begin to appear. By then any semblance of water will have been evaporated. During this preliminary heating period and thereafter during the entire dry-heat cooking period the previously-hard-boiled egg yolks are constantly being mashed and stirred as with a tined instrument or the like.

After continued heating at this same 375° to 400° F. temperature for some five (5) minutes after the vessel has reached this temperature, or until all dry content of the egg yolks has become charred, all of the oil will have been extracted from the egg yolks.

The charred residue of the yolks is removed and discarded and only the pure egg oil remains in the cooking vessel. This is removed and preserved for its future use. Preferably the oil is drained from the cooking vessel into sterile bottles or other suitable containers.

Approximately one (1) liquid ounce of this medically pure oil is obtained from each sixteen (16) ounces, by weight, of hard-boiled egg yolks.

As is apparent, the egg oil obtained by this process has not been subjected to mixture and/or solution with any other ingredient or additive: It has been heated at 375° to 400° F., which is not detrimental to the oil but is much above the accepted medical sterilization temperature of 212° F.

Therefore, the egg oil so obtained can be considered in all respects to be unadulterated, sterile, and medically pure and if maintained in this same condition it is safe for all purposes and uses where such qualities are required or desired.

It is contemplated that reasonable changes and/or variations might be made in this process without lessening the scope of the invention as here set forth and claimed.

Having thus described my invention, what I claim as new and desire to protect by Letters Patent is:

1. The process for extracting oil from egg yolks which comprises:

hard-boiling eggs in their shells in water;

breaking and removing said shells from said eggs after boiling;

separating the hard-boiled yolks from the white albumen portions and retaining said yolks; and heating said hard-boiled egg yolks in a clean dry cooking vessel at a temperature of between 375° and 400° F. for some 5 minutes until all oil is released and all other content of said egg yolks is charred.

2. The process as set forth in claim 1 and including as additional steps:

removing said charred egg yolk residue from said cooking vessel and disposing of same, leaving only pure extracted egg oil; and draining said extracted oil from said cooking vessel into sterile containers.

3. The process in accordance with claim 1 including as an added step:

mashing and stirring said egg yolks continuously while they are being dry-heated.

* * * * *